United States Patent
Zou et al.

(10) Patent No.: US 11,014,451 B2
(45) Date of Patent: May 25, 2021

(54) RECONFIGURABLE ELECTRICAL POWER CONVERSION SYSTEM

(71) Applicant: Ford Global Technologies, LLC, Dearborn, MI (US)

(72) Inventors: Ke Zou, Canton, MI (US); Theodore Joseph Filippi, Brownstown, MI (US); Jacek Brauner, Plymouth, MI (US); Allan Roy Gale, Livonia, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 16/165,430

(22) Filed: Oct. 19, 2018

(65) Prior Publication Data

US 2020/0122580 A1 Apr. 23, 2020

(51) Int. Cl.
| | |
|---|---|
| *B60L 1/00* | (2006.01) |
| *B60L 3/00* | (2019.01) |
| *B60K 6/40* | (2007.10) |
| *B60L 53/20* | (2019.01) |
| *B60L 53/30* | (2019.01) |

(52) U.S. Cl.
CPC ............... *B60L 1/006* (2013.01); *B60K 6/40* (2013.01); *B60L 53/20* (2019.02); *B60L 53/30* (2019.02); *B60Y 2200/92* (2013.01)

(58) Field of Classification Search
CPC .......... B60L 1/006; B60L 53/30; B60L 53/20; B60L 2230/22; B60L 53/302; B60L 53/305; B60K 6/40; B60Y 2200/92
See application file for complete search history.

(56) References Cited

U.S. PATENT DOCUMENTS

| | | | |
|---|---|---|---|
| 9,315,187 B2 | 4/2016 | Stenson | |
| 9,662,988 B2 | 5/2017 | Enomoto | |
| 2010/0102626 A1* | 4/2010 | Tachibana | H02J 1/08 307/9.1 |
| 2014/0159506 A1* | 6/2014 | Kim | H02M 3/1584 307/126 |
| 2015/0123598 A1* | 5/2015 | Tew | H02J 7/0047 320/107 |
| 2016/0097525 A1* | 4/2016 | Chien | H02J 7/00 362/135 |
| 2017/0092023 A1* | 3/2017 | Ishii | B60L 1/006 |
| 2018/0159325 A1* | 6/2018 | Klesyk | H02J 7/02 |
| 2019/0367004 A1* | 12/2019 | Kim | B60W 20/15 |

FOREIGN PATENT DOCUMENTS

WO WO-2019087053 A1 * 5/2019 .......... B60W 50/082

\* cited by examiner

*Primary Examiner* — Rexford N Barnie
*Assistant Examiner* — Rasem Mourad
(74) *Attorney, Agent, or Firm* — David B. Kelley; Brooks Kushman P.C.

(57) ABSTRACT

A power converter cartridge for a vehicle includes a housing slidably insertable into a body cavity of the vehicle and including electrical outlets and coolant, data, and power interface ports configured to connect to corresponding ports of the cavity, a converter, and a controller configured to, responsive to a signal from the vehicle via the data port, cause the converter to convert power received from a traction battery of the vehicle via the power interface port to supply corresponding external loads connected to the outlets.

9 Claims, 6 Drawing Sheets

RECONFIGURABLE ELECTRICAL POWER CONVERSION SYSTEM

TECHNICAL FIELD

The present disclosure relates to systems and methods for a vehicle reconfigurable electrical power conversion system.

BACKGROUND

The term "hybrid vehicle" may be used to describe vehicles having one or more sources of propulsion power, such as an internal combustion engine and an electric motor. Examples of hybrid vehicles include hybrid electric vehicles (HEV) and plug-in hybrid electric vehicles (MEV). An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

SUMMARY

A power converter cartridge for a vehicle includes a housing slidably insertable into a body cavity of the vehicle and including electrical outlets and coolant, data, and power interface ports configured to connect to corresponding ports of the cavity, a converter, and a controller configured to, responsive to a signal from the vehicle via the data port, cause the converter to convert power received from a traction battery of the vehicle via the power interface port to supply corresponding external loads connected to the outlets.

A reconfigurable power system for a vehicle includes an engine, a traction battery, and power converter cartridges, each slidable into a cavity of a body of the vehicle and including a converter, electrical outlets, and coolant, data, and power interface ports configured to connect to corresponding ports of the cavity such that the converter supplies external loads connected to the outlets with converted energy received via the power interface port from the battery and engine.

A system for a vehicle includes a removable cartridge configured to be disposed within a cavity of a body of the vehicle and including, power converters, electrical outlets, and coolant, data, and power interface ports configured to connect to the vehicle via corresponding ports of the cavity, wherein at least one pair of the converters is configured to supply, at a same time, an external load connected to one of the outlets with converted energy received via the power interface port from a traction battery of the vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A modular structure design for a vehicle onboard power system may be configured to output and/or to receive as input different forms and values of electrical power. In one example, the power system may include at least one power conversion unit disposed on the vehicle. Each power conversion unit may be configured to interface between the onboard high voltage battery and external power loads or sources. Each power conversion unit may include a same form factor and power rating.

In some instances, the power conversion units may be configured to provide and receive different voltage types such that the vehicle may interface with different types of loads or sources. In some other instances, the power conversion units may be configured to provide same voltage types, such that the vehicle may interface with large power loads or sources.

Figure 1A:
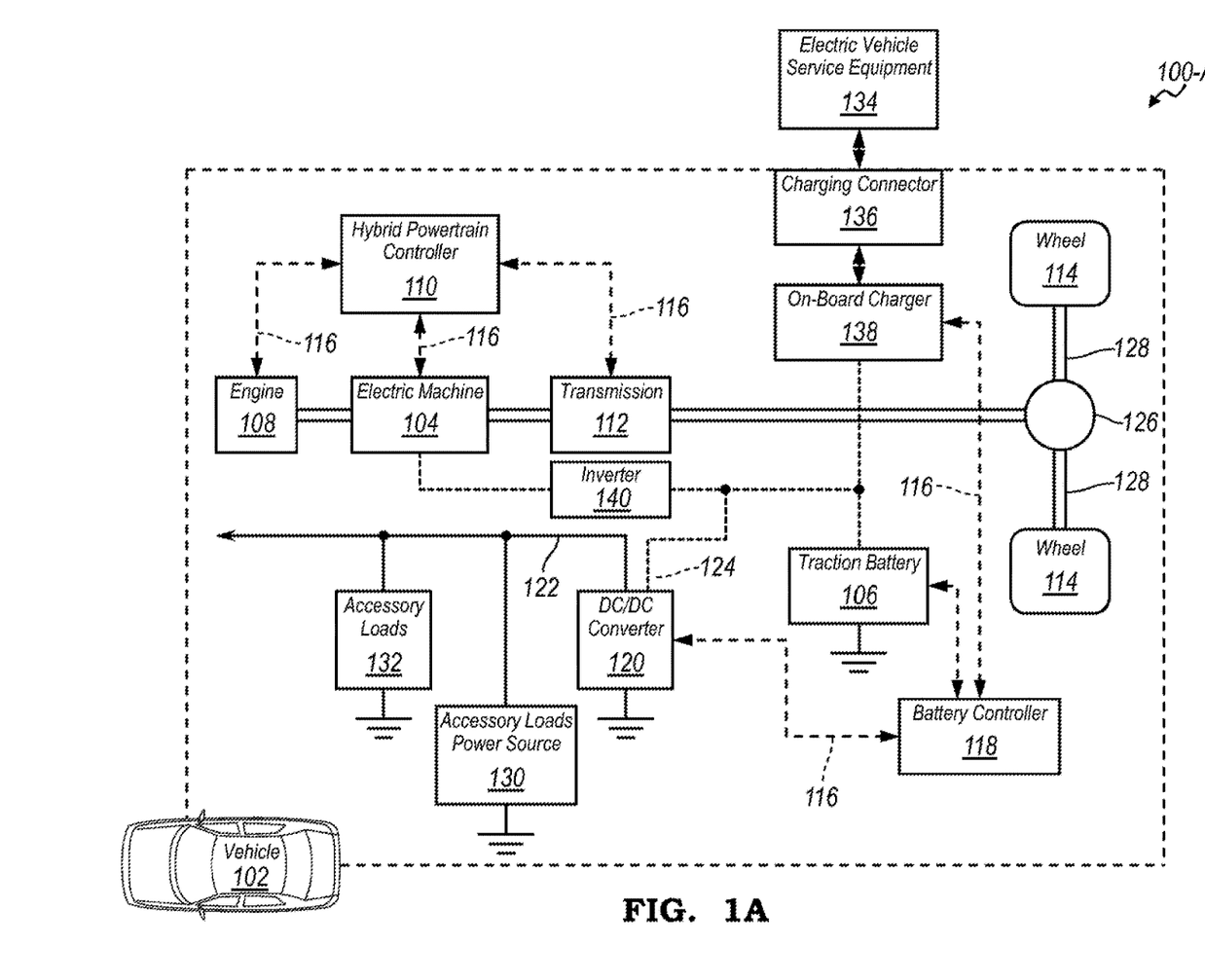
FIG. 1A is a block diagram of a plug-in hybrid electric vehicle (PHEV) illustrating a typical drivetrain and energy storage components.

FIG. 1A illustrates an example power distribution system 100-A for a hybrid electric vehicle (hereinafter, vehicle) 102. The vehicle 102 includes one or more electric machines 104 capable of operating as one or both of an electric motor and generator, a traction battery 106, an engine 108, and a multiple-ratio automatic transmission 112. The vehicle 102 further includes a hybrid powertrain controller 110 configured to monitor and control 116 operation of one or more components of the vehicle 102.

The engine 108 and the electric machine 104 are drive sources for the vehicle 102. Although not separately illustrated herein, the engine 108 may, in some instances, be connectable to the electric machine 104 through a disconnect clutch, such that an engine output shaft connectable to a motor input shaft, whereby the engine 108 and the electric machine 104 may be connected in series. The electric machine 104 may be selectively connectable to the engine 108 via, for example, a torque converter.

The transmission 112 is connected to a differential. 126 via a corresponding output shaft and drive wheels 114 are connected to the differential 126 through respective axles 128. The driving force applied from the engine 108 and/or the electric machine 104 is transmitted (e.g., through the torque converter and/or the transmission 112) to the drive wheels 114 thereby propelling the vehicle 102. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque. In one example, the transmission. 112 may be automatically shifted from one ratio to another based on the needs of the vehicle 102.

In an example arrangement, the engine 108 may be a primary source of power for the vehicle 102. The engine 108 may be an internal combustion engine, such as a gasoline, diesel, or natural gas-powered engine. The engine 108 generates engine torque that is supplied to the electric machine 104 when the engine 108 and the electric machine 104 are connected with one another. To drive the vehicle 102 with the engine 108, at least a portion of the engine torque passes from the engine 108 to the electric machine 104 and then from the electric machine 104 to the transmission 112.

The traction battery 106 in some arrangements may be another source of propulsion power for the vehicle 102. As described in reference, for example, to FIG. 1D, the traction battery 106 may comprise a plurality of battery cells, e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor.

A battery controller 118 may be configured to monitor and control operation of the traction battery 106. In one example, the battery controller 118 configured to control the plurality of connectors and switches, e.g., contactors, of the traction battery 106. In such an example, the battery controller 118 may command one or more contactors to open or close connecting or disconnecting the traction battery 106 from other vehicle 102 components.

The battery controller 118 may be electrically connected to and in communication with one or more other vehicle controllers, such as, but not limited to, a body controller, a climate control controller, a brake controller, and so on, and may command one or more contactors to open or close in response to receiving a signal from the other vehicle controllers. Additionally or alternatively, the battery controller 118 may be in communication with the hybrid powertrain controller 110 and may command to charge and discharge the traction battery 106 responsive to one or more signals from the hybrid powertrain controller 110. In some examples, the hybrid powertrain controller 110, the battery controller 118, and other vehicle controllers may communicate with one another and with other components of the vehicle 102 via one or more in-vehicle networks, such as, but not limited to, one or more of a vehicle controller area network (CAN), an Ethernet network, and a media-oriented system transfer (MOST), as some examples.

The battery controller 118 may be further configured to receive signals from a plurality of vehicle 102 sensors (not illustrated), such as, but not limited to, battery voltage sensor, battery current sensor, battery temperature sensor, ambient temperature sensor, and so on. The battery controller 118 may command to transfer energy to and from the traction battery 106 responsive to receiving a signal from the one or more vehicle sensors. While the traction battery 106 is described as including electrochemical cells, other types of energy storage device implementations, such as capacitors, are also contemplated.

The vehicle 102 may be configured to recharge the traction battery 106 via a connection to a power grid. The vehicle 102 may, for example, cooperate with electric vehicle supply equipment (EVSE) 134 of a charging, station to coordinate the charge transfer from the power grid to the traction battery 106. In one example, the EVSE 134 may have a charge connector for plugging into a charging connector 136 of the vehicle 102, such as via connector pins that mate with corresponding recesses of the charging connector 136. The charging connector 136 may be electrically connected to an on-board charger (hereinafter, charger) 138. The charger 138 may condition the power supplied from the EVSE 134 to provide the proper voltage and current levels to the traction battery 106. The charger 138 may be electrically connected to and in communication with the EVSE 134 to coordinate the delivery of power to the vehicle 102.

The vehicle 102 may be configured to receive one or more power types, such as, but not limited to, single- or three-phase AC power and DC power. The vehicle 102 may be configured to receive different levels of AC and DC voltage including, but not limited to, Level 1 120-volt (V) AC charging, Level 2 240V AC charging, Level 1 200-450V and 80 amperes (A) DC charging, Level 2 200-450 and up to 200 A. DC charging. Level 3 200-450V and up to 400 A DC charging, and so on. Time required to receive a given amount of electric charge may vary among the different charging methods. In some instances, if a single-phase AC charging is used, the traction battery 106 may take several hours to replenish charge. As another example, same amount of charge under similar conditions may be transferred in minutes using other charging methods.

In one example, both the charging connector 136 and the EVSE 134 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, the Chinese GB/T 27930, GB/T 18487.1, GB/T 20234.1, GB/T 20234.2, GB/T 20234.3 and so on, in one example, the recesses of the charging connector 136 may include a plurality of terminals, such that first and second terminals may be configured to transfer power using Levels 1 and 2 AC charging, respectively, and third and fourth terminals may be DC charging terminals and may be configured to transfer power using Levels 1, 2, or 3 DC charging.

Differently arranged connectors having more or fewer terminal are also contemplated. In one example, the charging connector 136 may include terminals configured to establish a ground connection, send and receive control signals to and from the EVSE 134, send or receive proximity detection signals, and so on. A proximity signal may be a signal indicative of a state of engagement between the charging connector 136 of the vehicle 102 and the corresponding connector of the EVSE 134. A control signal may be a low-voltage pulse-width modulation (PWM) signal used to monitor and control the charging process. The charger 138 may be configured to initiate transfer of energy to the vehicle 102 responsive to receiving a corresponding signal from the EVSE 134. In one example, the charger 138 may be configured to initiate charging responsive to a duty cycle of the request signal being greater than a predefined threshold.

The traction battery 106 is electrically connected 124 to the electric machine 104, such that energy stored in the traction battery 106 can be used and/or replenished by the electric machine 104. The connection (illustrated generally as a dotted line) 124 between the traction battery 106 and the electric machine 104 may be a high voltage connection configured to transfer voltages greater than 50 volts (V). In one example, the electric machine 104 may be electrically connected to an inverter 140 providing bi-directional energy transfer between the electric machine 104 and the traction battery 106. When the electric machine 104 operates in a motor mode, the inverter 140 may convert high voltage direct current (DC) output provided by the traction battery 106 to a three-phase alternating current (AC) as may be required for proper functionality of the electric machine 104. When the electric machine 104 operates in a regenerative mode, the inverter 140 may convert the three-phase AC output from the electric machine 104 acting as a generator to the DC input required by the traction battery 106. In addition to providing energy for propulsion, the traction battery 106 may provide energy for other vehicle electrical components, such as one or more compressors and electric heaters, that operate using voltages greater than 50V.

The traction battery 106 may be configured to provide energy to a low voltage DC supply that is compatible with other electrical loads of the vehicle 102. A DC/DC converter 120 may be connected between a low voltage connection 122 used by one or more low voltage subsystems or components and the high voltage connection 124 used by, for example, the electric machine 104 and the traction battery 106. The high and low voltage connections 124, 122 may be electrical circuit connections that operate to transfer respective amounts of electrical current, withstand respective amounts of voltage differential, and so on, that are different from one another. As one example, the high voltage connection 124 may be configured to transfer electrical current greater than electrical current transferred by the low voltage connection 122. As another example, the high voltage connection 124 may connect to components requiring operating voltage that is greater than operating voltage associated with components connected to the low voltage connection 122.

In some instances, the DC/DC converter 120 may be a bi-directional buck-boost converter configured to convert power flowing to and from the high voltage connection 124 and the low voltage connection 122. For example, in buck mode the DC/DC converter 120 may reduce ("buck") the high voltage DC output of the traction battery 106 to low voltage DC input required by the low voltage connection 122 components. In another example, the DC/DC converter 120 operating in a boost mode may increase ("boost") the low voltage DC output of the low voltage connection 122 components to a high voltage DC input compatible with the traction battery 106.

The battery controller 118 may monitor and control operation of the DC/DC converter 120 and the low voltage subsystems or components, such as activating the converter 120 to charge or discharge the low voltage connection 122 components, activating the low voltage connection 122 components to transfer power to assist propulsion, energize or deenergize the low voltage connection 122 components when the engine 108 is turned off, permit or inhibit activation of the converter 120, and so on. Additionally or alternatively, the DC/DC converter 120 and some or all of the low voltage connection 122 components may be configured to receive command signals from the hybrid powertrain controller 110. In some instances, the low voltage subsystems or components electrically connected with one another and with other portions of the vehicle 102 electrical distribution network via the low voltage connection 122 may be generally referred to as a low voltage bus.

The low voltage bus may be an electrical bus connecting together one or more low voltage connection 122 components, such as, but not limited to, an accessory loads power source 130 and accessory loads 132. The accessory loads power source 130 connected to the low voltage connection 122 may be configured to provide energy to the accessory loads 132, such as, but not limited to, cabin and propulsion system climate control, cabin lighting, vehicle audio system, and so on. Other examples of powering the accessory loads 132 may be powering one or more electrical loads of the vehicle 102 during ignition off and/or ermine off states.

Figure 1B:
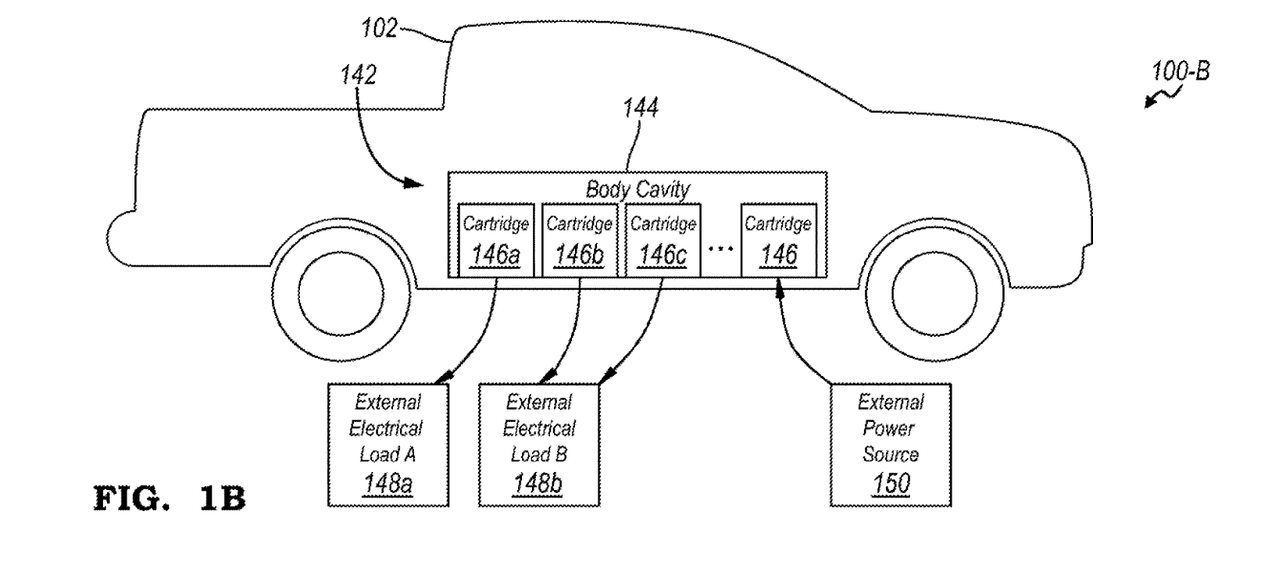
FIG. 1B is a block diagram illustrating a reconfigurable power distribution system.

FIG. 1B illustrates an example reconfigurable power converter distribution system 100-B for the vehicle 102. A body 142 of the vehicle 102 may define a cavity 144. The cavity 144 may be accessible from exterior or interior of the vehicle 102 and may be incorporated with vehicle 102 dashboard, centerstack, armrest, or another location within body interior or exterior promoting user access. The cavity 144 may be configured to slidably receive at least one power converter cartridge (hereinafter, cartridge) 146. The cartridge 146 may include a housing configured to house one or more electrical components to supply power to an external electrical load 148 connected to, and drawing current or power from, the vehicle 102 and/or receive power from an external power source 150 connected to, and supplying power, energy, current, and so on, to the vehicle 102.

In some instances, the cavity 144 may be configured to receive an n number of the cartridges 146 slidably insertable thereto and/or removable therefrom. The cartridges 146 As described in further detail in reference to at least FIG. 1D, one or more cartridges 146 disposed within the cavity 144 of the vehicle. 102 may include one or more power converters, electrical outlets, and coolant, data, and power interface ports configured to connect to the vehicle 102 via corresponding ports of the cavity 144.

A first cartridge 146a may be used to power up a first external electrical load 148a. The second and third cartridges 146b, 146c may be configured to, in combination, power a second external electrical load 148b. Accordingly, in some instances, at least one pair of the cartridges 146 may be configured to supply, at a same time, the external electrical load 148 connected thereto with converted energy provided by the vehicle 102.

The nth cartridge may be configured to interface with an external power source 150, such as, but not limited to, conventional and alternative sources of power supplied by utility power grid, generator, batteries, solar panels, wind turbines, and so on, to transfer electrical energy or power to the vehicle 102.

Figure 1C:
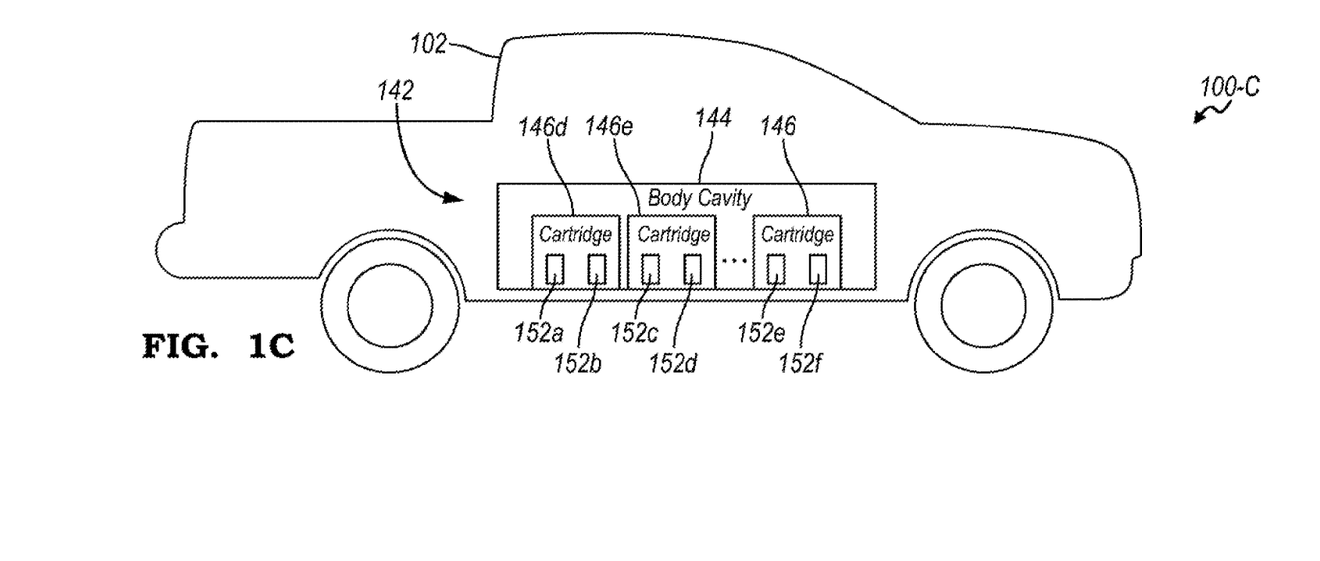
FIG. 1C is a block diagram illustrating a power distribution system arrangement.

FIG. 1C illustrates an example configuration 100-C of the reconfigurable power distribution system for the vehicle 102. Each cartridge 146 may include one or more electrical outlets 152. In some instances, the fourth cartridge 146d may include first and second outlets 152a, 152b. The fifth cartridge 146e may include third and fourth outlets 152e, 152d, the nth cartridge 146 may include outlets 152e, 152f, and so on.

Additionally or alternatively, the outlets 152a, 152b, 152c, 152d, 152e, 152f may include voltage and current ratings same or different from one another. In one example, the outlets 152a, 152h of the fourth cartridge 146d may be configured output voltage and current same or different from voltage and current output by each of the outlets 152e, 152d of the fifth cartridge 146e and so on. In another example, connector recess configurations of the outlets 152 of a same cartridge 146 may be same or different from one another, and the configurations of one cartridge are different from the corresponding configurations of another cartridge.

Figure 1D:
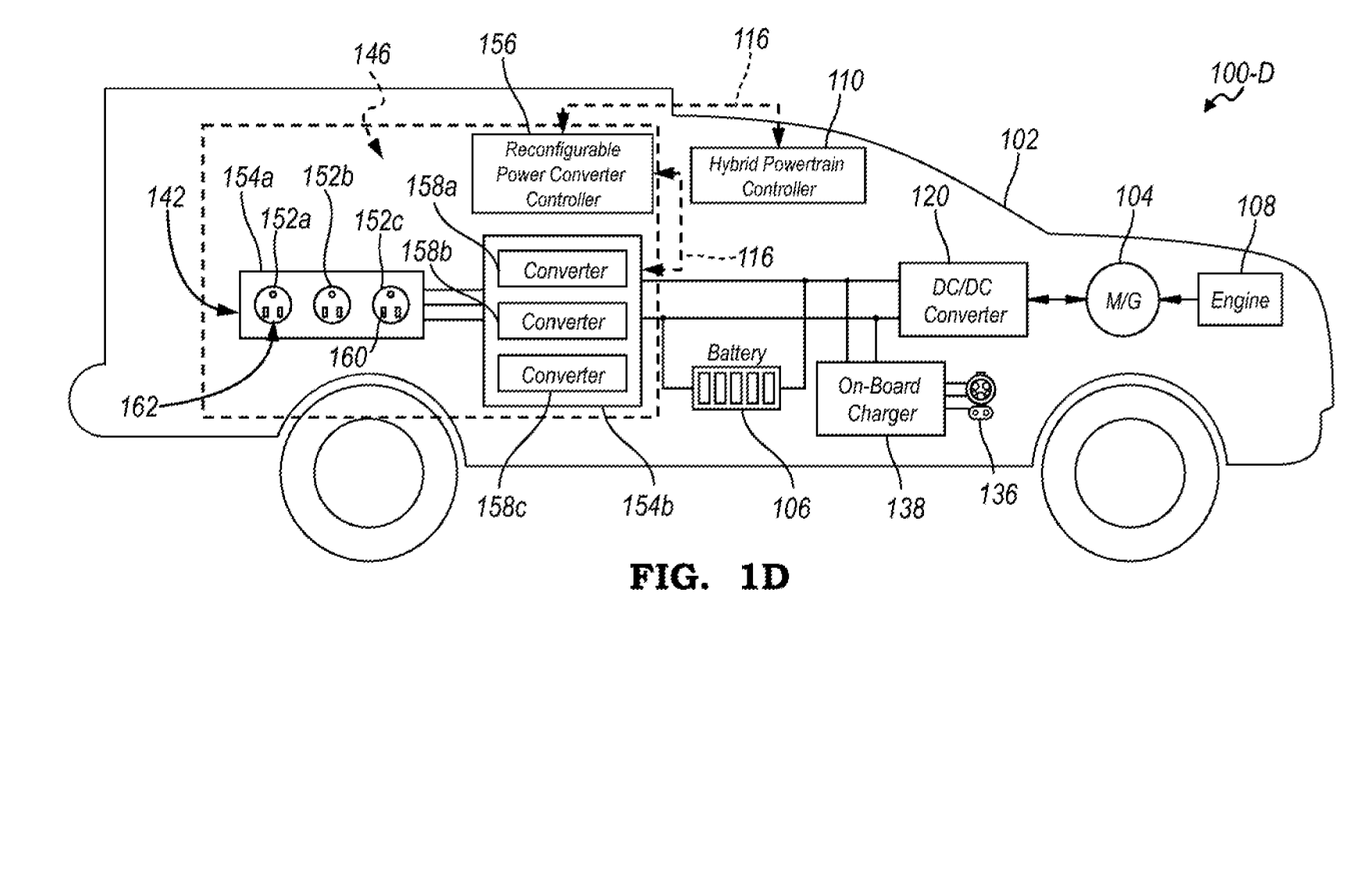
FIG. 1D is a block diagram illustrating a hybrid vehicle power distribution arrangement.

As described in reference to at least FIG. 1D, each of the cartridges 146 may include one or more power converters converting power supplied to and received via each of the outlets 152. Other configuration, layouts, and combinations of cartridges, converters, and outlets, such as in series, in parallel, and so on, are also contemplated.

FIG. 1D illustrates an example power conversion system 100-D for supplying power to electrical loads external to the vehicle 102. The system 100-D may be implemented in combination with one or more components described in reference to at least FIG. 1A, such as, but not limited to, the electric machine 104, the traction battery 106, the engine 108, the transmission 112, the onboard charger 138, and so on, each monitored and controlled by one or more corresponding controllers, e.g., the hybrid powertrain controller 110, the battery controller 118, and so on. In some instances, the cartridge 146 (illustrated generally with a dashed line) selectively removable from the cavity 144 may include a housing 154 configured to house a reconfigurable power converter controller 156, converters 158, and the outlets 152. The controller 156 may include a processor configured to execute instructions for transferring power between the vehicle 102 and one or more external electrical loads 148.

The reconfigurable power converter controller 156 may be configured to control. 116 the converters 158 and/or the outlets 152 to cause the converters 158 to convert power received from the traction battery 106 and/or the engine 108 of the vehicle 102 to supply corresponding external loads 148 connected to the outlets 152. As another example, the reconfigurable power converter controller 156 may configured to cause the converters 158 to convert power received at the outlets 152 from the external power source 150 connected thereto to charge the traction battery 106.

Figure 3:
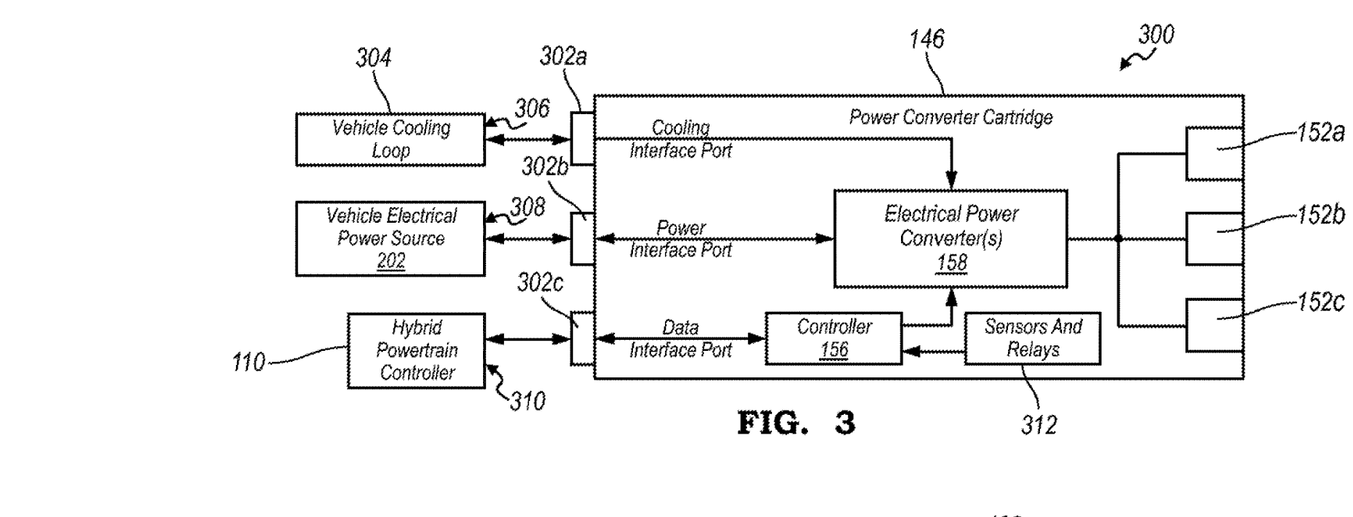
FIG. 3 is a block diagram illustrating a power conversion cartridge.

As described in reference to at least FIG. 3, the housing 154 of the cartridge 146 may include a data interface port configured to connect to a corresponding port of the vehicle 102. In one example, the reconfigurable power converter controller 156, via the data interface port of the housing 154, may be connected to and in communication 116 with the hybrid powertrain controller 110, via a corresponding data interface port of the vehicle 102.

In another example, the converters 158 may be configured to convert power received, via the power interface port of the housing 154, from the traction battery 106 and/or the engine 108, via a corresponding power interface port of the vehicle 102, to supply corresponding external loads 148 connected to the outlets 152. In still another example, the converters 158 may be configured to convert power received from external power sources 150 connected to the outlets 152 to supply, via the power interface port of the housing 154 connected to a corresponding power interface port of the vehicle 102, to charge the traction battery 106. Additionally or alternatively, the outlets 152a, 152b, 152c may include voltage and current ratings same or different from one another, such that connector recess 160 configurations 162 of the outlets 152 of a same cartridge 146 may be same or different from one another and the configurations 162 of one cartridge 146 are different from the corresponding configurations 162 of another cartridge 146.

In some instances, as described in reference to at least FIG. 3, the cartridge 146 may include a coolant interface port configured to connect to a corresponding coolant interface port of the vehicle 102 to circulate refrigerant through the cartridge 146. In one example, the controller 156 of the cartridge 146 may be configured to, during supplying or receiving of power to and from external loads/sources, initiate to circulation of refrigerant through the housing 154 of the cartridge 146. While the coolant interface port is described as circulating refrigerant, the arrangement 1004) is not so limited and, in some instances, may be air-cooled, cooled using heat absorption, or some combination thereof.

The controller 156 may be configured to cause the converters 158 to convert and transfer electrical power while the transmission 112 of the vehicle 102 is in DRIVE, REVERSE, or NEUTRAL. Additionally or alternatively, controller 156 may be configured to cause the converters 158 to convert and transfer electrical power while a speed of the vehicle 102 is greater than zero. Accordingly, the cartridges 146 may be configured to supply power to the external loads 148 and/or receive power from the external power sources 150 while the vehicle 102 is out of PARK or while the vehicle 102 is moving.

Figure 2:
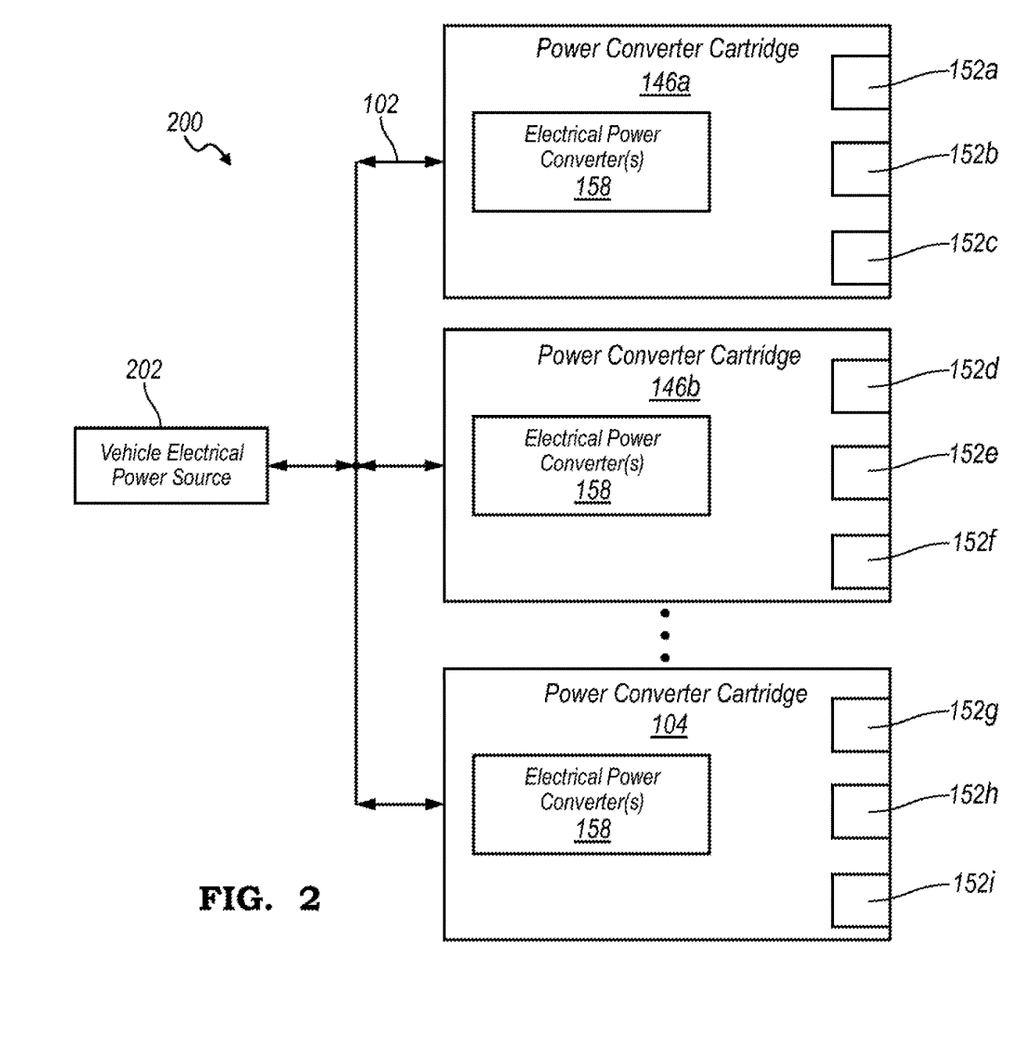
FIG. 2 is a block diagram illustrating a power conversion arrangement.

FIG. 2 illustrates an example power conversion arrangement 200 for the vehicle 102. Each power converter cartridge 146 may include one or more converters 158 configured to convert and transfer power between the outlets 152 and an electrical power source 202 of the vehicle 102. As some non-limiting examples, the power source 202 may be one or more of the traction battery 106, the engine 108, the electric machine 104, and the accessory loads power source 130. Additionally or alternatively, the power source 202 may include power generated through the use of regenerative braking and other motive and non-motive power sources of the vehicle 102.

In one example, the converters 158 may be configured to convert the power being output by the power source 202 to the desired forms of electrical power to support external loads 148 and/or to receive power being input to the outlets 152 by one or more different external power sources 150. Additionally or alternatively, two or more converters 158 may supply power, at a same time, to a single outlet 152 configured to receive and output different voltage and current levels.

FIG. 3 illustrates an example power conversion cartridge arrangement 300 for the vehicle 102. The controller 156 may be configured to monitor and control a plurality of sensors and relays 312 that detect operating conditions of and activate and deactivate the converters 158 and the outlets 152. In one example, the controller 156 may receive signals from the sensors and relays 312 indicating that the external load 148 has been connected to or disconnected from the outlet 152a. In response to the connecting or disconnecting of the load 148, the controller 156 may cause the sensors and relays 312 to open or close to cause the converter 158 to supply power or interrupt power supply to the external load 148. As another example, the controller 156 may, in response to one or more signals from the sensors and relays 312, cause the converters 158 and the outlets 152 of the cartridge 146 to supply and receive different voltage and power values.

The cartridge 146 may include a coolant interface port 302a configured to connect to a coolant loop 304 of the vehicle 102. In one example, the coolant interface port 302a may connect to the coolant loop 304 of the vehicle 102 via a corresponding coolant interface port 306 to circulate a coolant medium, e.g., refrigerant, air, and so on, through the cartridge 146. In one example, the controller 156 of the cartridge 146 may be configured to, during supplying or receiving of power to and from external loads/sources, initiate circulation of the coolant medium between one or more components of the vehicle 102 and the cartridge 146.

In another example, the converters 158 may be configured to convert power received, via a power interface port 302b, from power source 202, e.g., the traction battery 106 and/or the engine 108, via a corresponding power interface port 308 of the vehicle 102, to supply corresponding external loads 148 connected to the outlets 152. In still another example, the converters 158 may be configured to convert power received from external power sources 150 connected to the outlets 152 to supply power, via the power interface port 302b of the housing 154 connected to the power interface port 308 of the vehicle 102, to the vehicle 102, e.g., to charge the traction battery 106, to power the accessory loads 132, and so on.

The cartridge 146 may include a data interface port 302e configured to connect to a corresponding data port 310 of the vehicle 102. In one example, the reconfigurable power converter controller 156, via the data interface port 302e of the housing 154, may be connected to and in communication 116 with the hybrid powertrain controller 110, via the data interface port 310 of the vehicle 102. In another example, responsive to one or more signals via the data interface port 302e, the cartridges 146 may be configured to supply power to the external loads 148 and/or receive power from the external power sources 150 while the vehicle 102 is out of PARK or while the vehicle 102 is moving. Accordingly, the controller 156, responsive to one or more signals from the hybrid powertrain controller 110, may cause the converters 158 to convert and transfer electrical power while the transmission 112 of the vehicle 102 is in DRIVE, REVERSE, or NEUTRAL. Additionally or alternatively, responsive to one or more signals from the hybrid powertrain controller 110, controller 156 may cause the converters 158 to convert and transfer electrical power while a speed of the vehicle 102 is greater than zero.

While the hybrid powertrain controller 110 is illustrated as connected to and in communication with the controller 156 of the cartridge 146, the arrangement 300 is not so limited. In some instances, the controller 156 may use the data interface port 302e to connect to additional or different controllers of the vehicle 102, such as, but not limited to, the battery controller 118.

Figure 4A:
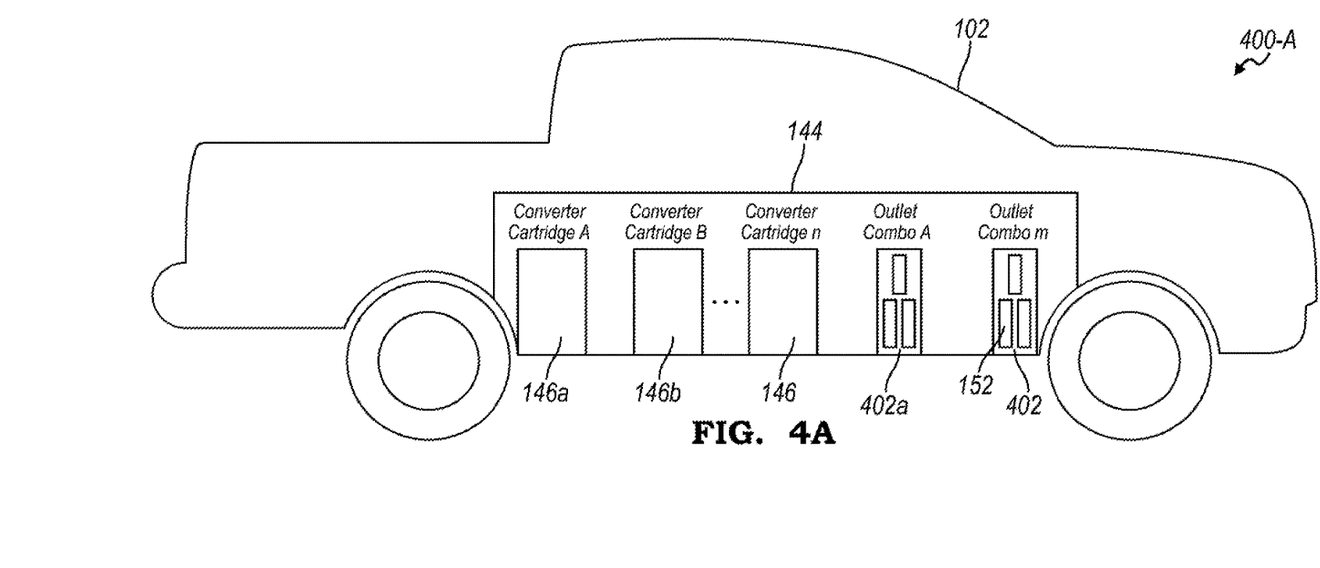
FIG. 4A is a block diagram illustrating a power conversion arrangement.

FIG. 4A illustrates an example reconfigurable power conversion arrangement 400-A for the vehicle 102. The arrangement 400 may include a power converter cartridge 146 including a power converter 158 and a plurality of outlets 152 disposed separately from one another, e.g., the outlets 152 are disposed separately from the housing 154 of the cartridge 146. Each converter 158 may be used to convert the DC voltage of the traction battery 106 to a different form of electricity such as single-phase AC 120V or 240V, or three-phase AC 208V or 480V, or DC with different voltage levels, e.g., step-up (boost) or step-down (buck) converter. In some instances, several converters 158 may be connected electrically in parallel to increase power being output by the cartridge 146. Each outlet combination. 402 may include one or several outlets 152 to interface with external loads 148 or power sources 150. In some instances, a particular combination of the cartridges 146, the converter 158, the owlet combinations 402, and the outlets 152 may be selected according to user needs.

Figure 4B:
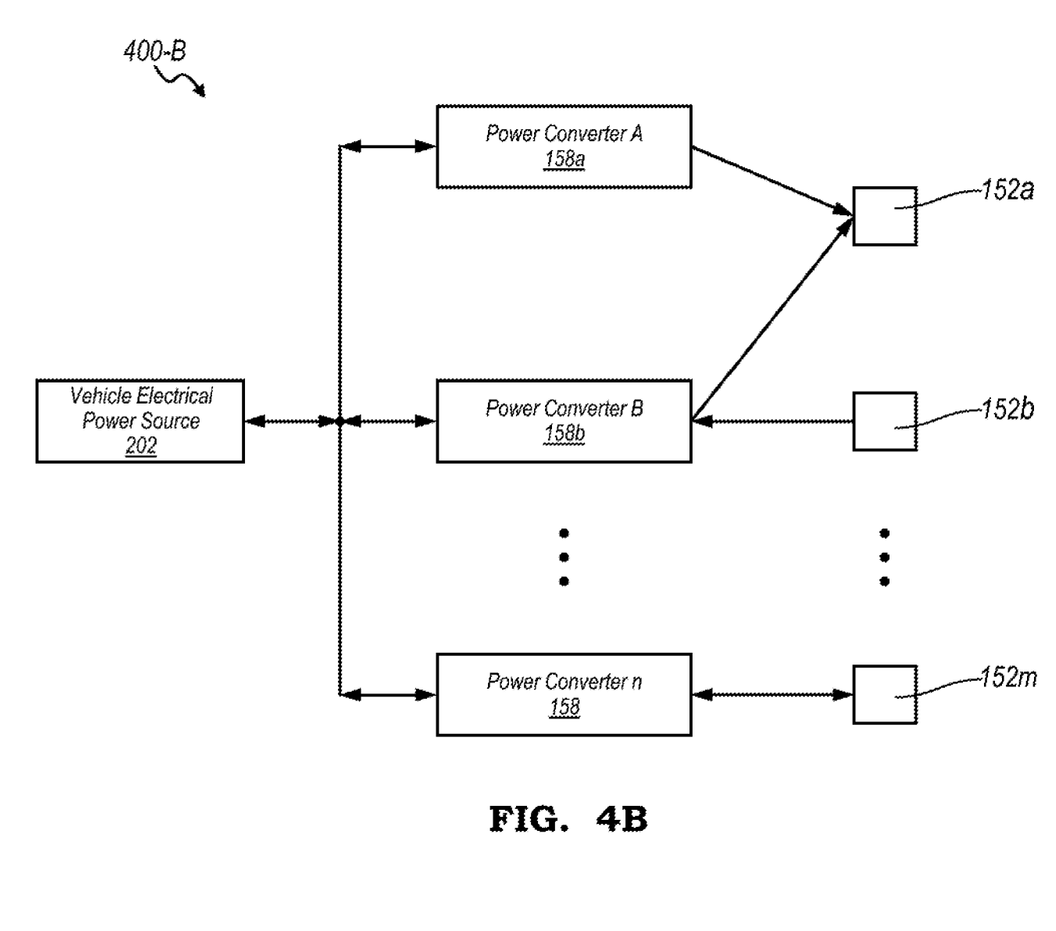
FIG. 4B is a block diagram illustrating an arrangement for a plurality of vehicle power converters.

FIG. 4B illustrates an example arrangement 400-B for a plurality of power converters 158 of the cartridge 146. The arrangement 400-B includes at least one pair of the cartridges 146 and/or converters 158 configured to supply, at a same time, the external electrical load 148 connected thereto with converted energy provided by the vehicle 102. In one example, the first outlet 152a may be connected to a pair of the first and second converters 158a, 158b, respectively, and may be configured to output power exceeding 50V. The second outlet 152b may be connected to the second converter 158b and may be configured to transfer external power to the vehicle 102 e.g., to charge the traction battery 106 and so on. The wrath outlet 152 may be a bi-directional outlet connected to the nth converter 158 and may be configured to both supply power to and transfer power from the vehicle 102.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power converter cartridge for a vehicle comprising:
a housing slidably insertable into a body cavity of the vehicle and including electrical outlets and coolant, data, and power interface ports configured to connect to corresponding ports of the cavity, a converter operable to convert power received from a traction battery of the vehicle to at least two different voltage and current levels for supply to external loads connected to the outlets, and wherein the converter is further operable to convert alternating current power received from the outlets by an external power source to a direct current power for charging the battery, and a controller configured to, responsive to a signal from the vehicle via the data port, cause the converter to convert power received from the traction battery of the vehicle via the power interface port to supply corresponding external loads connected to the outlets, wherein the controller is further configured to, responsive to another signal from the vehicle, cause the converter to convert power received at the outlets from the external power source connected thereto to charge the traction battery, wherein the coolant port is connected to a coolant system of the vehicle and is operable to circulate refrigerant through the housing to cool the converter when converting power received from the traction battery.

2. The cartridge of claim 1, wherein the power is received from the battery and an engine.

3. The cartridge of claim 1, wherein the causing is while a transmission of the vehicle is in PARK, DRIVE, REVERSE, or NEUTRAL.

4. The cartridge of claim 3, wherein the causing is while a speed of the vehicle is greater than zero or while the vehicle is stationary.

5. A reconfigurable power system for a vehicle comprising:
an engine;
a traction battery; and
power converter cartridges, each slidable into a cavity of a body of the vehicle and including a converter, electrical outlets, and coolant, data, and power interface ports configured to connect to corresponding ports of the cavity such that the converter is operable to supply at least two different voltage and current levels to external loads connected to the outlets with converted energy received via the power interface port from the battery and engine, and the converter is further operable to convert alternating current power received from the electrical outlets by an external power source to a direct current power for charging the traction battery, a controller configured to, responsive to a signal from the vehicle via the data port, cause the converter to convert power received from the traction battery of the vehicle via the power interface port to supply corresponding external loads connected to the outlets, wherein the controller is further configured to, responsive to another signal from the vehicle, cause the converter to convert power received at the outlets from the external power source connected thereto to charge the traction battery, and wherein the coolant port is connected to a coolant system of the vehicle and is operable to circulate refrigerant through the power converter cartridges to cool the converter when converting power received from the traction battery and when converting the alternating current power to the direct current power.

6. The system of claim 5, wherein voltage and current ratings of the outlets of one of the cartridges are different from the corresponding ratings of the outlets of another of the cartridges.

7. The system of claim 5, wherein connector recess configurations of the outlets of a same cartridge are different from one another, and the configurations of one cartridge are different from the corresponding configurations of another cartridge.

8. The system of claim 5, wherein the supplying is while a transmission of the vehicle is in PARK, DRIVE, REVERSE, or NEUTRAL.

9. The system of claim 8, wherein the supplying is while a speed of the vehicle is greater than zero or while the vehicle is stationary.

* * * * *